N. M. BAKER.
SPECTACLES.
APPLICATION FILED APR. 18, 1914.
1,115,482.
Patented Nov. 3, 1914.
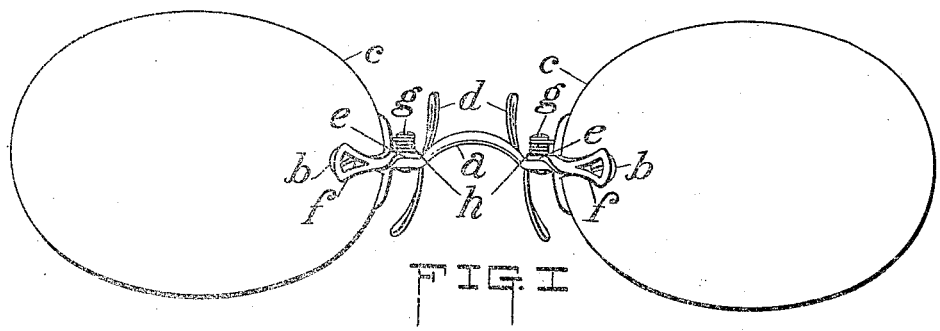
FIG. I
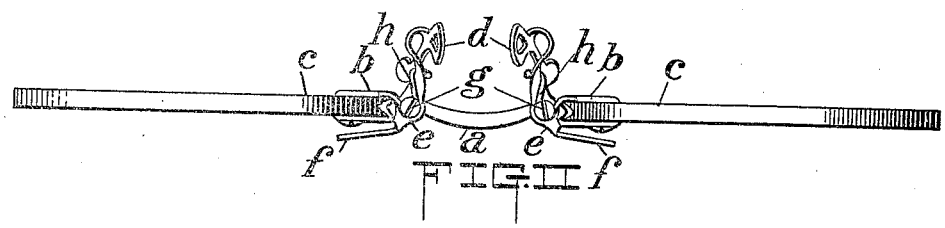
FIG. II
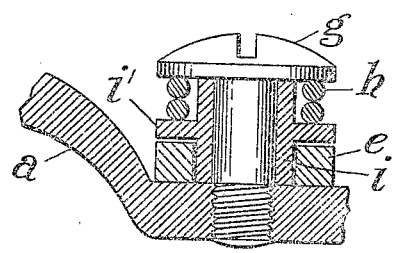
FIG. III
WITNESSES:
Joseph J. Demers
William A. Funning
INVENTOR
NELSON M. BAKER
BY
H. H. Stytt & H. K. Parsons
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

SPECTACLES.

1,115,482. Specification of Letters Patent. Patented Nov. 3, 1914.

Original application filed October 10, 1908, Serial No. 457,119. Divided and this application filed April 18, 1914. Serial No. 832,907.

*To all whom it may concern:*

Be it known that I, NELSON M. BAKER, a citizen of the United States, residing at Southbridge, in the county of Worcester and State of Massachusetts, have invented certain new and useful Improvements in Spectacles, of which the following is a specification.

My invention relates to eyeglasses in which the nose clamps are swiveled and spring pressed, and are preferably provided with finger pieces for manipulating them, and has for its object to provide an improved bearing for the finger piece which will be secure and which will not readily wear out through continued use.

A further object of my invention is the provision in a mounting of the character mentioned, in which the support is provided with a pivot to one side thereof, on which both the lever and the actuating means for the lever are mounted, of means interposed between the head of the pivot and the lever for steadying the lever and preventing wabbling thereof.

More specifically stated, my invention resides in placing upon the pivot a tubular member acting as a distance piece between one side of the lever and the head of the pivot, whereby the sleeve limits axial movement of the lever on the pivot.

Other objects and advantages of my improvements should be readily apparent by reference to the following description taken in connection with the accompanying drawings, and it will be understood that I may make any modifications in the specific details of construction shown and described within the scope of the appended claims without departing from or exceeding the spirit of my invention.

This specification is a division of a prior application filed by me October 10, 1908, Serial No. 457,119.

Figure I is a face view of a pair of eyeglasses, my invention applied thereto. Fig. II is a plan view thereof. Fig. III is an enlarged detail view with the parts in section.

(*a*) represents the nose bridge, to each end of which are secured the lens clamps (*b*) between which are fastened the lenses (*c*). Nose clamps (*d*) serve to maintain the glasses in position on the face and are provided with lever arms (*e*) which terminate in operating finger pieces (*f*). Screws (*g*) extend into the nose piece (*a*) and serve as pivots by which the lever arms (*e*) and nose clamps (*d*) may be swung, the lever arms being preferably perforated to receive the screws. A spring (*h*) surrounds each of said screws (*g*) with its one end abutting against the lens clamp (*b*) and its other end in engagement with the nose clamp (*d*). The tendency of this spring is to press the nose clamps (*d*) toward each other so that a pressure is exerted on the nose of the wearer for maintaining the glasses in position. To limit axial movement of the arm (*e*) on the pivot I provide a sleeve (*i*) having a shoulder or flange (*i'*), said sleeve surrounding the screw (*g*) and the shoulder portion (*i'*) being disposed above the arm.

In Fig. III, I have shown the sleeve as fitting around the pivot throughout its whole length, the actuating spring being coiled around the sleeve and thus separated from the pivot screw by the sleeve.

To secure most efficient results I have shown the sleeve as extending downward below the shoulder portion (*i'*) through the lever into engagement with the support, thus serving as a spacing member to prevent pinching of the lever between the shoulder of the sleeve and the support, but it will be understood that the sleeve will operate equally satisfactory so far as prevention of axial movement on the pivot is concerned should it terminate at the lever, but more care would be necessitated in assembling of the parts.

I claim:

1. The combination with a support, of a pivot carried thereby having a head on its outer end, a lever on the pivot, a sleeve on the pivot beneath the head of the pivot confining the lever axially on the pivot, and an actuating spring for the lever encircling the sleeve and disposed in the space between the lever and the head of the pivot.

2. The combination with a support, of a pivot carried thereby, a lever pivotally mounted on the support, a sleeve on the pivot having a shoulder resting on the opposite side of the lever from the support and having a portion extending between the lever and the head of the pivot, and an actuating spring mounted on the sleeve exterior to said shoulder.

In testimony whereof I affix my signature in presence of two witnesses.

NELSON M. BAKER.

Witnesses:
C. FRED HILL,
JOSEPH J. DEMERS.